United States Patent
Kumamoto

(10) Patent No.: US 8,467,754 B2
(45) Date of Patent: Jun. 18, 2013

(54) APPARATUS AND METHOD FOR RECEPTION CONTROL

(75) Inventor: Tetsushi Kumamoto, Yokohama (JP)

(73) Assignee: Kyocera Corporation, Kyoto (JP)

( * ) Notice: Subject to any disclaimer, the term of this patent is extended or adjusted under 35 U.S.C. 154(b) by 776 days.

(21) Appl. No.: 12/524,833

(22) PCT Filed: Jan. 29, 2008

(86) PCT No.: PCT/JP2008/051267
§ 371 (c)(1),
(2), (4) Date: Mar. 4, 2010

(87) PCT Pub. No.: WO2008/093662
PCT Pub. Date: Aug. 7, 2008

(65) Prior Publication Data
US 2010/0178892 A1    Jul. 15, 2010

(30) Foreign Application Priority Data
Jan. 30, 2007   (JP) ................................. 2007-019058

(51) Int. Cl.
*H04B 17/00*   (2006.01)

(52) U.S. Cl.
USPC ...................................................... 455/226.1

(58) Field of Classification Search
USPC ............. 455/343, 424, 42, 456.5, 456.6, 561, 455/550.1, 575.1, 574, 147, 127.5, 343.2, 455/343.4, 38.3, 343.1; 375/376, 345; 370/311, 370/335
See application file for complete search history.

(56) References Cited

U.S. PATENT DOCUMENTS

| | | | | |
|---|---|---|---|---|
| 5,680,593 A * | 10/1997 | Hiiragizawa | ................... | 713/500 |
| 5,943,613 A * | 8/1999 | Wendelrup et al. | ......... | 455/343.1 |
| 6,029,061 A * | 2/2000 | Kohlschmidt | ................ | 455/574 |
| 6,078,873 A * | 6/2000 | Shutty et al. | .................... | 702/89 |
| 6,088,602 A * | 7/2000 | Banister | ........................ | 455/574 |
| 6,240,304 B1 * | 5/2001 | Blankenstein et al. | ........ | 455/574 |
| 6,542,727 B1 | 4/2003 | Kikuchi | ........................ | 455/343 |
| 7,024,173 B2 | 4/2006 | Yamauchi et al. | ......... | 455/343.1 |
| 7,197,341 B2 * | 3/2007 | Bultan et al. | ................... | 455/574 |
| 8,135,553 B2 * | 3/2012 | Yang et al. | ...................... | 702/89 |
| 8,219,345 B2 * | 7/2012 | Haartsen et al. | ................ | 702/89 |
| 2004/0152438 A1 | 8/2004 | Yamauchi et al. | ......... | 455/343.1 |
| 2006/0195260 A1 * | 8/2006 | Gronemeyer | ................ | 701/213 |

FOREIGN PATENT DOCUMENTS

| | | |
|---|---|---|
| JP | 2000-244351 | 9/2000 |
| JP | 2002-353875 | 12/2002 |
| JP | 2005-260670 | 9/2005 |

* cited by examiner

*Primary Examiner* — Yuwen Pan
*Assistant Examiner* — Ankur Jain
(74) *Attorney, Agent, or Firm* — DLA Piper LLP (US)

(57) ABSTRACT

A CPU 15 measures a temperature change amount at each reception timing of an broadcast information signal (PCH) of a predetermined period and determines the period of the reception timing of the broadcast information signal with reference to a table, stored in a memory unit 16, storing correspondences between the temperature change amount and periods of the reception timing of the broadcast information signal. When the reception of the broadcast information signal is failed, the CPU 15 counts an average number of clocks of a low frequency clock signal of a low frequency clock oscillator 21 per period at the time of reception of the broadcast information signal based on a high frequency clock signal of a high frequency clock oscillator 20, and predicts and determines the reception timing of the next broadcast information signal based on the average number of clocks.

4 Claims, 7 Drawing Sheets

FIG. 5

| TEMPERATURE RANGE | ALLOWABLE TEMPERATURE CHANGE AMOUNT/10s | PERIOD |
|---|---|---|
| 20~30°C | ±0.44°C | 10s |
| 15~20°C, 30~35°C | ±0.22°C | 10s |
| 10~15°C, 35~40°C | ±0.15°C | 5.12s |
| 0~10°C, 40~50°C | ±0.09°C | 2.56s |
| -15~0°C, 50~65°C | ±0.55°C | 2.56s |
| -35~-5°C, 65~85°C | ±0.34°C | 2.56s |

APPARATUS AND METHOD FOR RECEPTION CONTROL

CROSS-REFERENCE TO THE RELATED APPLICATIONS

This application is a national stage of international application No. PCT/JP2008/051267 filed on Jan. 29, 2008, which also claims the benefit of priority under 35 U.S.C. §119 to Japanese Patent Application No. 2007-019058 filed on Jan. 30, 2007, the entire contents of which are incorporated herein by reference.

TECHNICAL FIELD

The present invention relates to an apparatus and a method for reception control to control an intermittent reception timing.

BACKGROUND ART

In order to reduce the power consumption, a mobile terminal apparatus in a standby state uses a high frequency clock signal for a reception operation while using a low frequency clock signal for time management and the likes when it receives a broadcast information signal from a base station, and stops a high frequency clock oscillator used for the reception operation and uses a low frequency clock signal alone when the mobile terminal apparatus is not receiving the broadcast information signal from the base station. The mobile terminal apparatus counts the number of clocks until a reception timing of the next broadcast information signal by using the low frequency clock signal, and activates the high frequency clock oscillator at the point when the number of clocks reaches the reception timing of the broadcast information signal so as to shift to the reception operation (see Patent Document 1, for example).

Patent Document 1: Japanese Patent Laid-Open Publication No. 2000-244351

SUMMARY OF INVENTION

Technical Problem

The mobile terminal apparatus set forth above stops the high frequency clock oscillator and operates by use of a low frequency clock oscillator when the mobile terminal apparatus is not receiving the broadcast information signal in a standby state. At this time, since the low frequency clock oscillator has the lower frequency accuracy than that of the high frequency clock oscillator, it may cause a frequency deviation in a low frequency clock signal. In a case where a loss of synchronization with the reception timing of the broadcast information signal is caused due to the frequency deviation exceeding a certain level in the low frequency clock signal, the mobile terminal apparatus must perform a sequence of synchronization processes from an initial processing to an establishment of a standby state for the purpose of resynchronization, which results in waste of power.

The mobile terminal apparatus determines a window width for reception of the broadcast information signal transmitted from a base station in consideration of the frequency deviation caused by Doppler effect and the likes when the mobile terminal apparatus moves at a speed of 100 km per hour or so. However, the window width is not determined in consideration of the frequency deviation specific to the low frequency clock oscillator and is in a range incapable of absorbing the frequency deviation.

Moreover, although the mobile terminal apparatus measures intervals to the reception timing of the broadcast information signal by use of the low frequency clock signal, the frequency deviation of the low frequency clock signal may about ±20 ppm at an normal temperature and may even reach about ±60 ppm due to a change in the temperature. The frequency deviation in the low frequency clock signal is primarily caused by temperature. If the mobile terminal apparatus loses the synchronization with the reception timing of the broadcast information signal due to the frequency deviation in the low frequency clock signal, it is necessary to perform resynchronization, which leads to wasteful power consumption from the initial processing to the establishment of the standby state.

In view of such problems, an object of the present invention is to provide an apparatus and a method for reception control capable of receiving the broadcast information signal without fail even when over a certain level of the frequency deviation is caused in the low frequency clock signal due to the influence of the temperature.

Solution to Problem

In order to achieve the object stated above, a reception control apparatus in accordance with the present invention includes: a first oscillator for generating a first clock signal of high frequency; a second oscillator for generating a second clock signal of lower frequency than that of the clock signal generated by the first oscillator with less power consumption than that of the first oscillator; a reception unit for receiving a signal transmitted; a first control unit for controlling the reception unit to receive a signal based on the first clock signal generated by the first oscillator when performing intermittent reception, and to operate based on the second clock signal generated by the second oscillator by instructing to stop the first oscillator when not performing the intermittent reception; a decision unit for counting an average number of clocks of the second oscillator per period based on the first clock signal generated by the first oscillator and for predicting and determining a timing of the next intermittent reception based on the average number of clocks; a measurement unit for measuring a temperature change amount at each timing of the intermittent reception of a predetermined period; and a second control unit for controlling the period of the timing of the intermittent reception based on the measured temperature change amount.

It is preferred that the second control unit controls the period of the timing of the intermittent reception to be shorten when the temperature change amount measured by the measurement unit exceeds a predetermined level, and that the reception control apparatus further includes a memory unit for storing information indicating a correspondence between the temperature change amount and the period of the timing of the intermittent reception, and the second control unit controls the period of the timing of the intermittent reception based on the temperature change amount measured by the measurement unit and the information indicating the correspondence.

A reception control method in accordance with the present invention, for controlling so as to receive a signal based on a first clock signal of high frequency when performing intermittent reception and so as to instruct to stop the first clock signal and to operate based on the second clock signal of lower frequency than that of the first clock signal when not performing the intermittent reception, includes the steps of: counting the average number of clocks of the second clock signal per period based on the first clock signal when performing the intermittent reception, and predicting and determining the timing of the next intermittent reception based on the average number of clocks; measuring the temperature change amount at each timing of the intermittent reception of a predetermined period; and determining the period of the timing of the intermittent reception based on a measured temperature change amount.

Advantageous Effects on Invention

According to the present invention, the temperature change amount is measured at each reception timing of the broadcast information signal of a predetermined period and the period of the reception timing of the broadcast information signal is determined based on the measured temperature change amount. Moreover, the average number of clocks of the low frequency clock signal per period is counted based on the high frequency clock signal when receiving the broadcast information signal and the reception timing of the next broadcast information signal is predicted and determined based on the average number of clocks. Therefore, the broadcast information signal can be received without fail even when a frequency deviation of the low frequency clock signal over a certain level is caused due to the influence of temperature.

BRIEF DESCRIPTION OF DRAWINGS

FIG. 5 is a diagram illustrating an example of a table storing the allowable temperature changing degree and the period of the reception timing of the broadcast information signal for each temperature range;

DESCRIPTION OF EMBODIMENTS

Figure 1:
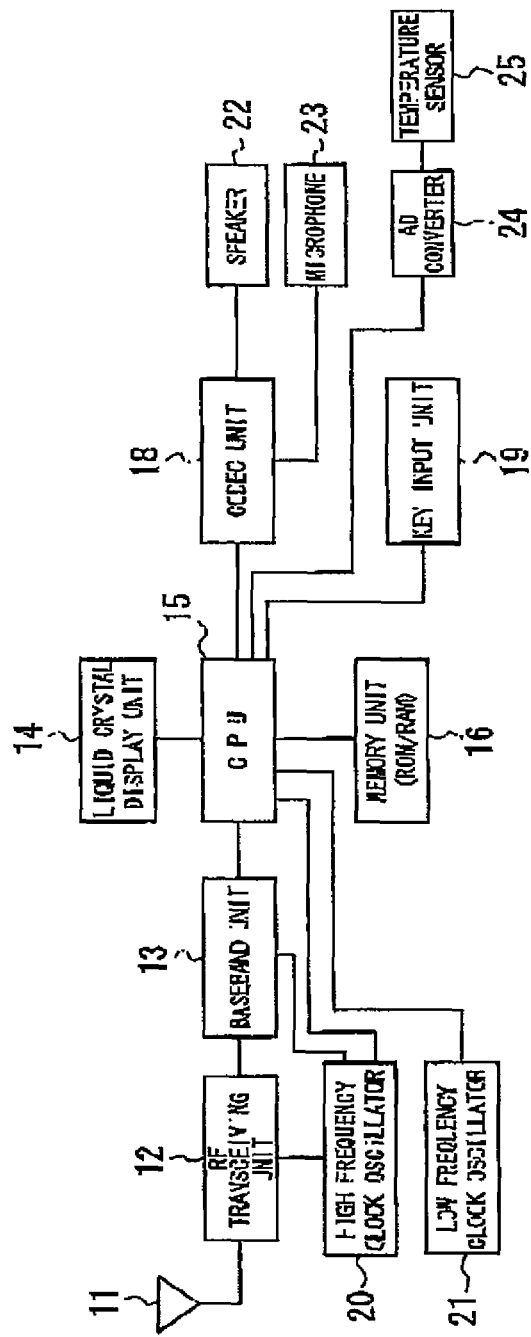
FIG. 1 is a system configuration diagram of a reception control apparatus in accordance with the present invention.

Embodiments of the present invention will be described with reference to accompanying drawings. FIG. 1 is a system configuration diagram of a reception control apparatus in accordance with the present invention. It is to be noted that the embodiment exemplifies a cellular phone as a reception control apparatus. As shown in FIG. 1, the reception control apparatus is provided with an RF transceiving unit 12 for transmitting and receiving a signal with a base station via an antenna 11, a baseband unit 13 for modulating/demodulating the signal, a liquid crystal display unit (LCD) 14, a memory unit 16 for storing programs, data and the likes, a codec unit 18 for performing analog to digital and digital to analog conversions of audio signals, a telephone speaker 22, a telephone microphone 23, an AD conversion unit 24 for converting an analog voltage value of a temperature sensor 25 into a digital voltage value, a CPU (decision unit, a first and a second control units) 15 for processing and controlling the signal, a key input unit 19 for providing the CPU 15 with input information from a user, a high frequency clock oscillator 20 for generating a highly accurate high frequency clock signal, and a low frequency clock oscillator 21 for generating a low frequency clock signal of lower accuracy than that of the clock signal generated by the high frequency clock oscillator 20, with less power consumption than that of the high frequency clock oscillator 20.

When the cellular phone performs intermittent reception, that is, receives an broadcast information signal (PCH) in a standby state, the CPU 15 drives the RF transceiving unit 12 and the baseband unit 13 based on the high frequency clock signal (24 MHz) generated by the high frequency clock oscillator 20. When the cellular phone does not perform the intermittent reception, that is, does not receive the broadcast information signal (PCH) in the standby state, the CPU 15 instructs to stop the high frequency clock oscillator 20 and controls the cellular phone to operate based on the low frequency clock signal (32.768 kHz or 32 kHz) generated by the low frequency clock oscillator 21.

However, the low frequency clock oscillator described above has low frequency accuracy and is easily affected by temperature because an oscillator less expensive than that of the high frequency clock oscillator is employed as the low frequency clock oscillator. Therefore, the reception control apparatus may lose synchronization with the timing of the broadcast information signal (PCH) when a frequency deviation exceeding a certain level occurs in the low frequency clock signal.

Figure 2:
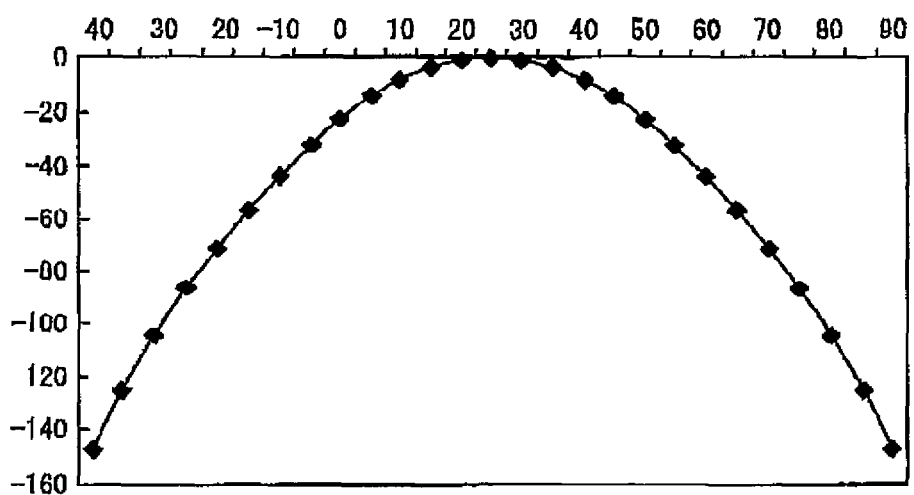
FIG. 2 is a diagram illustrating a frequency-temperature characteristic of a low frequency clock oscillator of 32.768 kHz.

In light of the problem stated above, the CPU 15 in accordance with the present invention measures a temperature change amount between the temperature measured at the reception of the previous broadcast information signal (PCH) and the temperature measured at the reception of the current broadcast information signal (PCH) and controls a period of a reception timing of the broadcast information signal (PCH) when the measured temperature change amount exceeds a predetermined level, so that the cellular phone can receive the broadcast information signal (PCH) even when the frequency deviation is caused by the change in the temperature. FIG. 2 is a diagram illustrating a frequency-temperature characteristic of the low frequency clock oscillator (tuning fork type quartz crystal unit) of 32.768 kHz. A vertical axis indicates the frequency deviation (unit: ppm), while a horizontal axis indicates the temperature (unit: ° C.). The frequency deviation is 0 ppm when the temperature is 25° C. This figure shows that there are a state where the temperature transits from −10° C. to 25° C. and the frequency elevates, another state where the temperature transits from 25° C. to −10° C. and the frequency declines, still another state where the temperature transits from 25° C. to 60° C. and the frequency declines, and yet another state where the temperature transits from 60° C. to 25° C. and the frequency elevates.

A frequency deviation amount $\Delta f$ of the low frequency clock oscillator of 32.768 kHz is approximated by the following formula by use of the frequency-temperature characteristic shown in FIG. 2:

$$\Delta f = 20 - 0.035(T-25)^2,$$

provided that a deviation amount specific to the low frequency clock oscillator is 20 ppm. In the formula, 0.035 is a secondary temperature coefficient (K) and (T−25) indicates a difference in the temperature from an normal temperature (25° C.). According to the actual measurement, the frequency deviation amount 20 ppm, specific to the low frequency clock oscillator, hardly changes at intervals of 10 seconds. In addition, the frequency deviation amount $\Delta f$ depends on the temperature change amount of an atmosphere inside the apparatus. Thus, the frequency deviation amount $\Delta f$ differentiated by the temperature is shown by:

$$\Delta f = -0.07(T-25)\Delta T.$$

That is, the frequency deviation amount $\Delta f$ at every 10 seconds depends on the temperature change amount at every 10 seconds and is determined by the temperature change amount and each temperature.

For the cellular phone, a window width to receive the broadcast information signal (PCH) transmitted from a base station is determined in consideration of the frequency deviation caused by Doppler effect and the likes when the cellular phone moves at a speed of 100 km per hour or so. When an allowable frequency deviation for the broadcast information signal to fit in the window width is ±0.2 ppm, the following formula:

$$\pm 0.2 = 0.07(T-25)\Delta T$$

is satisfied, and thereby an allowable temperature change amount $\Delta T$ satisfies the following formula:

$$\Delta T = \pm 0.2/0.07(T-25)$$

which determines the allowable temperature change amount at each temperature.

Figure 3:
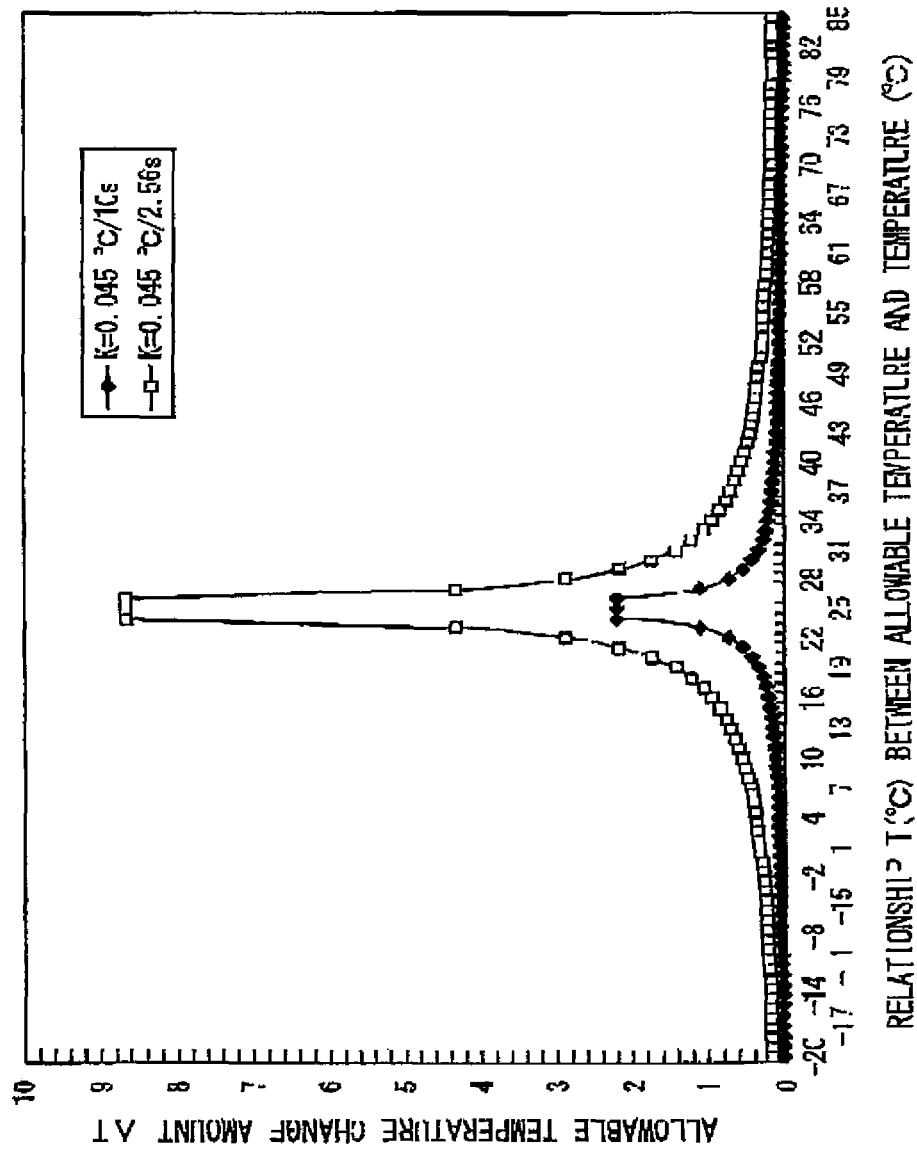
FIG. 3 is a diagram illustrating a relationship between an allowable temperature change amount and a temperature.

Here, when the secondary temperature coefficient (K) is 0.045, which is the worst coefficient, the following formula:

$$\Delta T = \pm 0.2/0.09(T-25)$$

is satisfied and shown in a curve in FIG. 3. FIG. 3 is a diagram illustrating a relationship between the allowable temperature change amount and the temperature when the temperature is measured at the intervals of 10 seconds with the allowable frequency deviation of ±0.2 ppm and at the intervals of 2.56 seconds with the allowable frequency deviation of ±0.78 ppm. It is shown that the cellular phone can receive the broadcast information signal (PCH) when the temperature is in the range of 3-47° C., provided that the allowable temperature change amount $\Delta T$ is 0.1° C. when the temperature is measured at the intervals of 10 seconds, and that the cellular phone can receive the broadcast information signal (PCH) when the temperature is in the range of 14-36° C., provided that the allowable temperature change amount $\Delta T$ is 0.2° C. It is to be noted that the secondary temperature coefficient (K) is predetermined in accordance with the low frequency clock oscillator.

Figure 4:
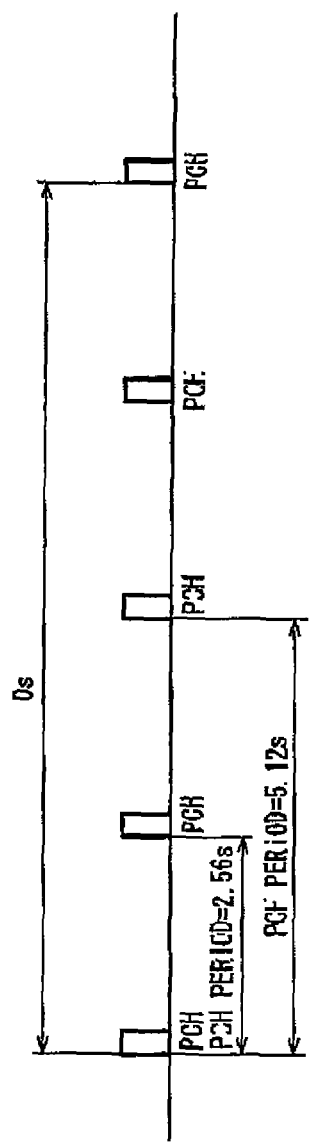
FIG. 4 is an explanatory diagram of a period of a reception timing of an broadcast information signal (PCH)

The reception control apparatus in accordance with the present invention measures the temperature change amount at the reception timing of the broadcast information signal (PCH) in the predetermined period (10 seconds, for example) and controls the period of the reception timing of the broadcast information signal (PCH) when the measured temperature change amount exceeds the allowable temperature change amount $\Delta T$, so that the broadcast information signal (PCH) can fit in the window width even when the frequency deviation is caused in the low frequency clock signal due to the influence of temperature. That is, when the temperature change amount measured at the intervals of 10 seconds exceeds the allowable temperature change amount, the period of the reception timing of the broadcast information signal (PCH) is determined as 5.12 seconds or 2.56 seconds as shown in FIG. 4, for example, to shorten the period of the reception timing of the broadcast information signal (PCH).

In particular, a table storing the correspondence between the allowable temperature change amount in each temperature range and the period of the reception timing of the broadcast information signal (PCH) is prepared in the memory unit 16, and the value of the period of the reception timing of the broadcast information signal (PCH) is determined with reference to the table. FIG. 5 shows an example of the table. With reference to the table, when the temperature is in the range of 10-15° C. or in the range of 35-40° C. and the temperature change amount determined at the intervals of 10 seconds exceeds ±0.15° C., the period of the reception timing of the next broadcast information signal (PCH) is determined as 5.12 seconds. When the temperature is in the range of 0-10° C. or in the range of 40-50° C. and the temperature change amount determined at the intervals of 10 seconds exceeds ±0.09° C., the period of the reception timing of the next broadcast information signal (PCH) is determined as 2.56 seconds. In addition, when the temperature is in the range of 20-30° C. and the temperature change amount determined at the intervals of 10 seconds does not exceed ±0.44° C., the period of the reception timing of the next broadcast information signal (PCH) is determined as 10 seconds.

Moreover, the reception control apparatus in accordance with the present invention determines the period of the reception timing by measuring the temperature change amount at each reception timing of the broadcast information signal (PCH) of the constant period, and, when receiving the broadcast information signal (PCH), counts the average number of clocks of the low frequency clock signal generated by the low frequency clock oscillator 21 per period based on the high frequency clock signal generated by the high frequency clock oscillator 20, so as to predict and determine the timing of the next intermittent reception based on the average number of clocks if the reception of the broadcast information signal (PCH) is failed.

In particular, the reception control apparatus detects rising of the low frequency clock signal of 32 kHz at the time of reception of the broadcast information signal (PCH) and counts the number of clocks of the high frequency clock signal of 24 MHz until the next rising of the low frequency clock signal of 32 kHz. By repeating it M times (approximately 30 times) and taking an average thereof, the reception control apparatus determines the average number of clocks (N) of the low frequency clock signal of 32 kHz in a period.

Figure 6:
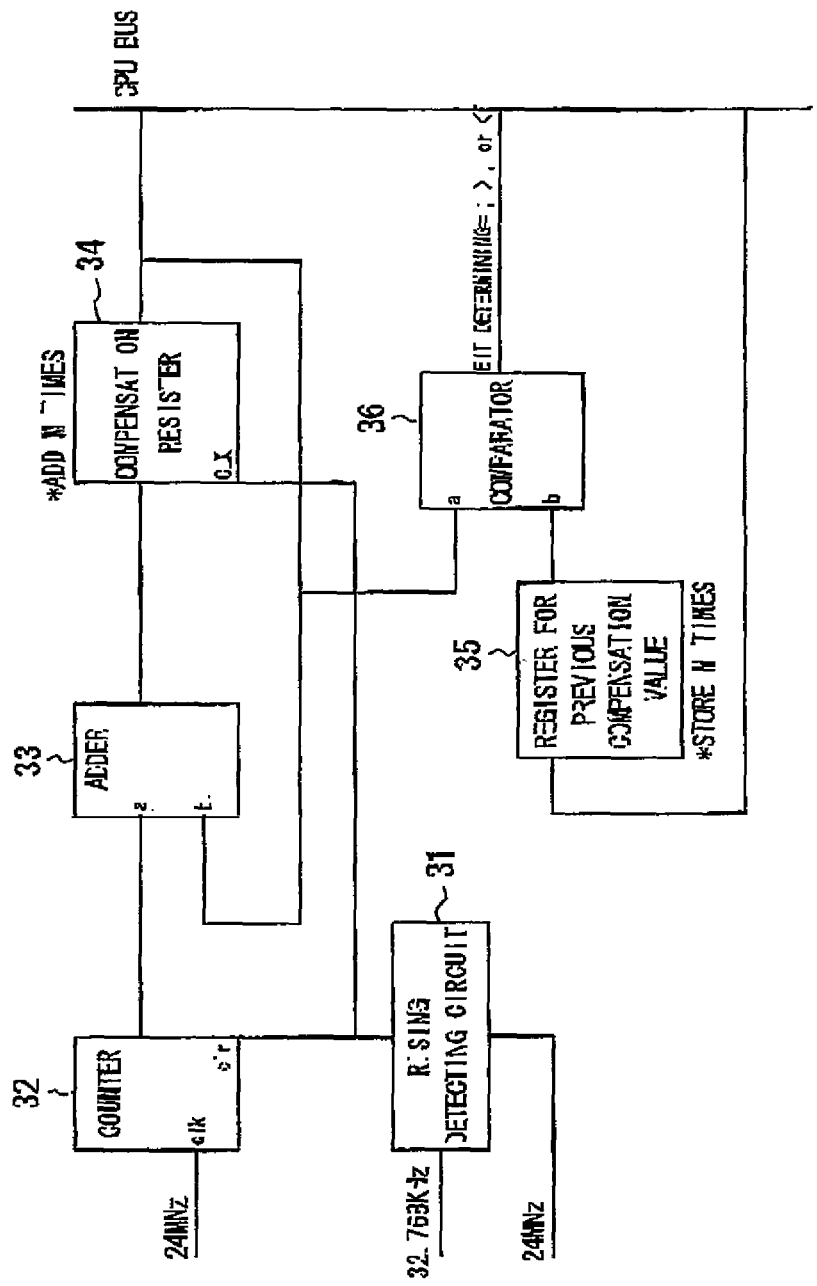
FIG. 6 is a diagram illustrating a clock counter circuit for determining the number of clocks of the low frequency clock signal in a period based on a high frequency clock signal.

FIG. 6 is a diagram illustrating a clock counter circuit for determining the number of clocks of the low frequency clock signal per period based on the high frequency clock signal. The clock counter circuit has a rising detection circuit 31, a counter 32, an adder 33, a compensation register 34, a register for the previous compensation value 35, and a comparator 36. Those elements are connected via a bus. When detecting a rising of a low speed clock signal of 32.768 kHz, the rising detection circuit 31 outputs a rising signal to the counter 32. When receiving the rising signal, the counter 32 is cleared and counts the number of clocks of a high speed clock signal of 24 MHz until receiving the next rising signal. The counted value of the counter 32 is added to the value in the compensation register 34 by the adder 33, and the total value is stored in the compensation register 34. The same processing is repeated M times (approximately 30 times) and the counter value (the number of high speed clocks) added M times is stored in the compensation register 34. The CPU (decision unit) 15 is capable of determining the average number of clocks of the low frequency clock signal per period by dividing the counter value added M times by M. The register for the previous compensation value 35 stores the counter value previously added M times, and the comparator 36 compares the counter value previously added M times and the counter value currently added M times to determine whether the value is increased or decreased.

After determining the average number of clocks N of the low frequency clock signal of 32 kHz per period, the CPU 15 then predicts and determines the reception timing of the broadcast information signal (PCH) with the low frequency clock signal by dividing the number of clocks of the high frequency clock signal in a period (10 seconds, for example) up to the reception of the broadcast information signal (PCH) by the average number of clocks N of the low frequency clock signal per period.

Figure 7:
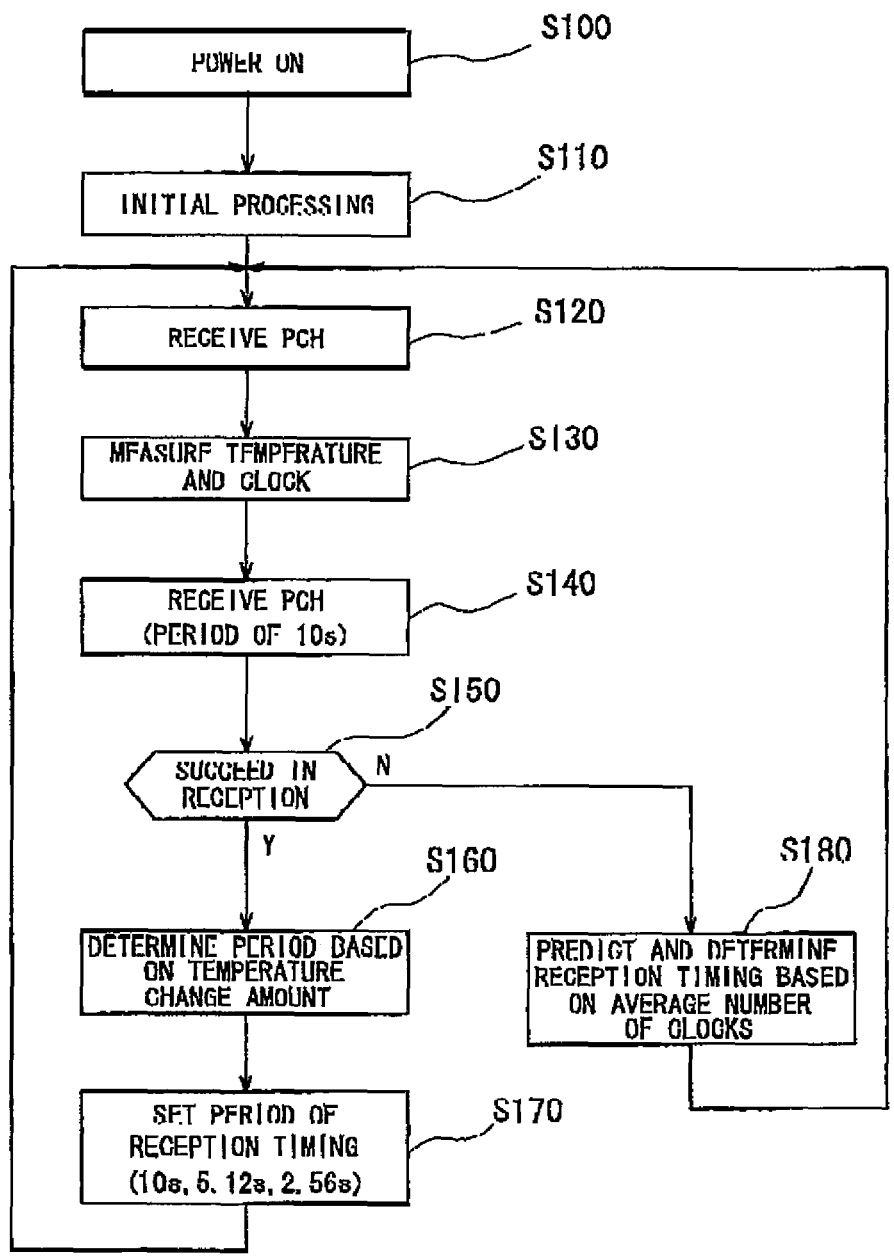
FIG. 7 is a flow chart illustrating a reception process of the broadcast information signal (PCH).

FIG. 7 is a flow chart illustrating a reception process of the broadcast information signal (PCH). When the user turns on the power of the cellular phone (S100), the cellular phone performs an initial processing (S110), receives the broadcast information signal (PCH) (S120), measures the temperature and counts the average number of clocks of the low frequency signal per period generated by the low frequency clock oscillator based on the high frequency clock signal (S130). The cellular phone next executes a reception processing of the broadcast information signal (PCH) at the intervals of 10 seconds (S140). When the cellular phone succeeds in receiving the broadcast information signal (PCH) at Step 150, the cellular phone measures the temperature to determine the temperature change amount from the temperature at the reception of the previous broadcast information signal (PCH). The cellular phone then determines the period of the reception timing of the next broadcast information signal (PCH) based on the determined temperature change amount with reference to the table shown in FIG. 5 (S160), and sets the period of the reception timing of the next broadcast information signal (PCH) to 10 seconds, 5.12 seconds or 2.56 seconds (S170), and then the process returns to the Step 120. When the cellular phone fails in receiving the broadcast information signal (PCH) at the Step 150, the cellular phone predicts and determines the timing of the next intermittent reception based on the average number of clocks per period described above (S180), and then the process returns to the Step 120.

As described above, according to the present invention the temperature change amount is measured at each reception timing of the broadcast information signal of a predetermined period, the period of the reception timing of the broadcast information signal is determined based on the measured temperature change amount, and, when the reception of the broadcast information signal is failed, the average number of clocks of the low frequency clock signal per period is counted at the time of reception of the broadcast information signal based on the high frequency clock signal and then the reception timing of the next broadcast information signal is predicted and determined based on the average number of clocks. Therefore, the broadcast information signal can be received without fail even when the frequency deviation exceeding the certain level occurs in the low frequency clock signal due to the influence of temperature.

The invention claimed is:

1. A reception control apparatus comprising:
a first oscillator for generating a first clock signal of high frequency; a second oscillator for generating a second clock signal of lower frequency than that of the clock signal generated by the first oscillator with less power consumption than that of the first oscillator;
a reception unit for receiving a signal transmitted; a first control unit for controlling the reception unit to receive a signal based on the first clock signal generated by the first oscillator when performing intermittent reception, and to operate based on the second clock signal generated by the second oscillator by instructing to stop the first oscillator when not performing the intermittent reception;
a decision unit for counting an average number of clocks of the second oscillator per period based on the first clock signal generated by the first oscillator and for predicting and determining a timing of the next intermittent reception based on the average number of clocks;
a measurement unit for measuring a temperature change amount at each timing of the intermittent reception of a predetermined period; and
a second control unit for controlling the period of the timing of the intermittent reception based on the temperature change amount measured, wherein
when receiving of the intermittent reception is successful, then the measurement unit measures the temperature change amount from a temperature at reception of a previous intermittent reception and the second control unit controls the period of the timing of the intermittent reception based on the temperature change amount; and
when receiving of the intermittent reception is failed, then a decision unit determines the timing of the next intermittent reception based on the average number of clocks;
the reception unit thereafter receiving another signal.

2. The reception control apparatus according to claim 1, wherein the second control unit controls the period of the timing of the intermittent reception to be shorten when the temperature change amount measured by the measurement unit exceeds a predetermined value.

3. The reception control apparatus according to claim 1 or 2,
further comprising a memory unit for storing information indicating a correspondence between the temperature change amount and the period of the timing of the intermittent reception,
wherein the second control unit controls the period of the timing of the intermittent reception based on the temperature change amount measured by the measurement unit and the information indicating the correspondence.

4. A reception control method for controlling so as to receive a signal based on a first clock signal of high frequency when performing intermittent reception, and so as to instruct to stop the first clock signal and to operate based on a second clock signal of lower frequency than that of the first clock signal when not performing the intermittent reception, the reception control method comprising the steps of:
counting an average number of clocks of the second clock signal per period based on the first clock signal when performing the intermittent reception and predicting and determining a timing of the next intermittent reception based on the average number of clocks;
measuring a temperature change amount at each timing of the intermittent reception of a predetermined period; and
determining the period of the timing of the intermittent reception based on the temperature change amount measured, wherein
when receiving of the intermittent reception is successful, then the temperature change amount is measured from a temperature at reception of a previous intermittent reception and the period of the timing of the intermittent reception is controlled based on the temperature change amount, and
when receiving of the intermittent reception is failed, then the timing of the next intermittent reception is determined based on the average number of clocks;
thereafter receiving another signal.

* * * * *